US011084146B2

(12) United States Patent
Bush et al.

(10) Patent No.: US 11,084,146 B2
(45) Date of Patent: Aug. 10, 2021

(54) SYSTEM FOR ASSEMBLY AND DISASSEMBLY OF A ROCKET MOTOR

(71) Applicant: The United States of America as represented by the Secretary of the Army, Washington, DC (US)

(72) Inventors: John Michael Bush, Huntsville, AL (US); Christina Blankenship, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 662 days.

(21) Appl. No.: 15/936,913

(22) Filed: Mar. 27, 2018

(65) Prior Publication Data

US 2019/0299367 A1    Oct. 3, 2019

(51) Int. Cl.
*B25B 1/20* (2006.01)
*F42B 15/36* (2006.01)
*B25B 1/24* (2006.01)
*F02K 9/97* (2006.01)

(52) U.S. Cl.
CPC .............. *B25B 1/20* (2013.01); *B25B 1/2415* (2013.01); *B25B 1/2457* (2013.01); *B25B 1/2463* (2013.01); *F02K 9/97* (2013.01); *F42B 15/36* (2013.01); *F05D 2230/68* (2013.01)

(58) Field of Classification Search
CPC ....... B25B 1/20; B25B 1/2415; B25B 1/2463; B25B 1/2457; F42B 15/36; F42B 33/00; F02K 9/97; F05D 2230/68
USPC .......................... 29/281.1, 243.55, 526, 240
See application file for complete search history.

(56) References Cited

U.S. PATENT DOCUMENTS

| 3,027,631 | A | | 4/1962 | Nathan | |
|---|---|---|---|---|---|
| 4,459,727 | A | * | 7/1984 | Burton | B23P 19/04 269/156 |
| 7,278,194 | B2 | * | 10/2007 | Pfau | B23P 11/027 29/281.1 |
| 10,125,556 | B1 | * | 11/2018 | Erdman, Jr. | B25B 1/20 |

* cited by examiner

*Primary Examiner* — Joseph J Hail
*Assistant Examiner* — Jonathan R Zaworski
(74) *Attorney, Agent, or Firm* — Michael K. Gray

(57) ABSTRACT

The system includes a forward clamping assembly, steady rests and compression assembly upon which the fuselage of a rocket is secured. The forward clamping assembly secures the forward fuselage of the rocket and the steady rests secure the middle fuselage of the rocket. The compression assembly includes a fluted nozzle rotator which engages the flutes of the nozzle of the rocket. Rotation of the nozzle rotator results in torque being applied to the joint connecting the rocket nozzle with the motor casing of the rocket so as to allow insertion or removal of an Ortman key that secures the motor casing and nozzle.

9 Claims, 8 Drawing Sheets

SYSTEM FOR ASSEMBLY AND DISASSEMBLY OF A ROCKET MOTOR

The invention described herein may be manufactured, used and licensed by or for the U.S. Government for U.S. Government purposes without payment of any royalties thereon.

BACKGROUND OF THE INVENTION

1. Field of the Invention

The invention generally relates to the assembly and disassembly of rockets. More particularly, the invention pertains to a system for safely installing and removing the rocket motors of an explosively loaded rocket that is assembled through the use of Ortman key joints or threaded joints.

2. Discussion of the Background

Rocket motor assembly and disassembly of small, military-type rockets has previously been a hands-on process. For disassembly, the warhead, which is typically located near a threaded joint at the head of the rocket motor, must first be removed. With the nose cone and warhead removed, the next step is to remove the rocket motor. In the past, the removal of the rocket motor was done using two personnel, with one person using a strap wrench on the motor side of the rocket and the other person using a strap wrench on the warhead side of the rocket. The rocket motor and nozzle are typically secured by an Ortman key. The old procedure was to strap the motor section in a table vise and then use a strap wrench to turn the nozzle so as remove the Ortman key and free the nozzle from the motor section. In that such a procedure did not immobilize the motor section, the incident movement of the rocket made disassembly difficult and the grounding of the rocket components was somewhat suspect with resulting apprehension for all those participating in the disassembly. Such a procedure was somewhat risky, tricky, tedious and time consuming.

SUMMARY OF THE INVENTION

The present invention is a system for assembly and disassembly of a rocket motor. The system is provided with a clamping assembly, a compression assembly and at least one steady-rest support which is located between the clamping assembly and the compression assembly. The clamping assembly, compression assembly and at least one steady rest support are mounted on a support platform or table.

The clamping assembly is located at the forward end of the support platform and is provided with a chuck mounted on a base support. The chuck has a plurality of grippers circumferentially disposed around a passageway which extends through the chuck and through the base support. The chuck has an adjusting handle for adjusting a radial distance from the axial center of the passageway to each of said plurality of grippers. The compression assembly is located at a nozzle end of the support platform and has a lever pole rotatable on a base member by a lever arm. The lever pole has an extension flange connecting to a cylindrical support, with the cylindrical support connecting to a fluted nozzle rotator such that a through passage extends through the cylindrical support and through the fluted nozzle rotator. The at least at least one steady rest has a lower portion having a hinged connection with an upper portion with the at least one steady rest having a plurality of radially adjustable securing members.

The fluted nozzle rotator is rotatable on the cylindrical support with a nozzle-facing side of the fluted nozzle rotator having a plurality of engagement protrusions for engaging a rocket nozzle. The s fluid nozzle rotator has a plurality of rotator handles for realizing manual rotation of the fluted nozzle rotator. The plurality of engagement protrusions are situated on a recessed center section and are radially oriented to the through passage which extends through the fluted nozzle rotator and the cylindrical support.

The system includes a ground distribution assembly for grounding the system so as not to accidentally ignite propellant of a rocket. The ground distribution assembly includes a ground distributor electrically connected to the clamping assembly, the compression assembly, the at least one steady rest support and to the igniter of a rocket when the rocket is attached to the clamping assembly, the compression assembly, and the at least one steady rest support.

The plurality of grippers of the clamping assembly can be adjusted to securely grip a forward portion of a rocket. The plurality of adjusters of said the at least one steady-rest support can be adjusted to securely grip a fuselage region of the rocket such that when said fluted nozzle rotator is rotated when the plurality of engagement protrusions are engaged in respective flutes of a rocket nozzle, torque is applied to the joint of the rocket which connects the rocket motor casing to the rocket nozzle.

DESCRIPTION OF THE DRAWINGS

A more complete appreciation of the invention and many of the attendant advantages thereof will be readily obtained by reference to the following detailed description when considered in connection with the accompanying drawings.

DETAILED DESCRIPTION

Figure 1:
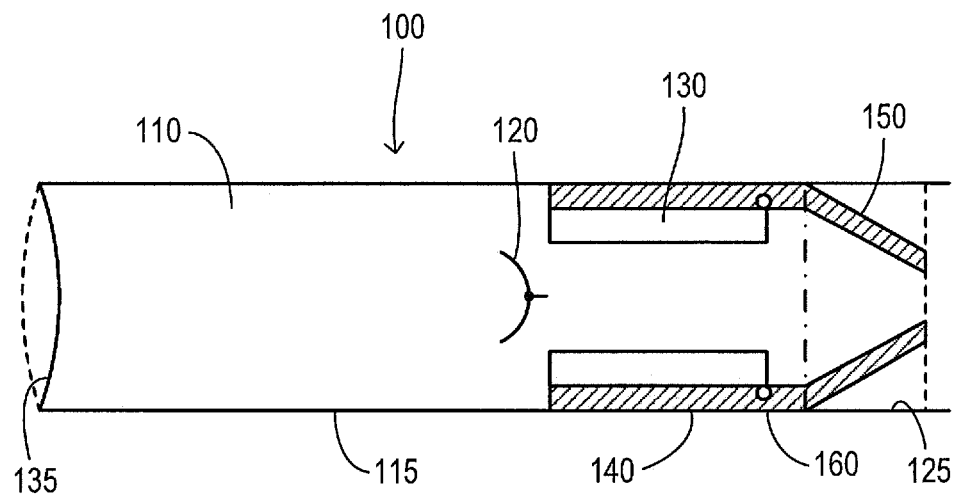
FIG. 1 is pedagogical x-ray, side view schematic illustration of a rocket of a type used with the present invention, with the rocket having its nose cone, and warhead removed.

With reference to FIG. 1, a rocket 100 of a type used with the present invention has had its nose cone section, along with any seeker components, removed, with the warhead or explosive section of the rocket having been removed as well.

Remaining under the skin of the rocket is the motor section 110, which includes an igniter 120, propellant 130, motor casing 140 and rocket nozzle 150. The nozzle 150 is located at the aft 125 of rocket fuselage 115 with the forward portion or rocket head section 135 of the rocket fuselage 115 having been connected to the nose cone (not shown) of the rocket previous to disassembly.

Figure 2:
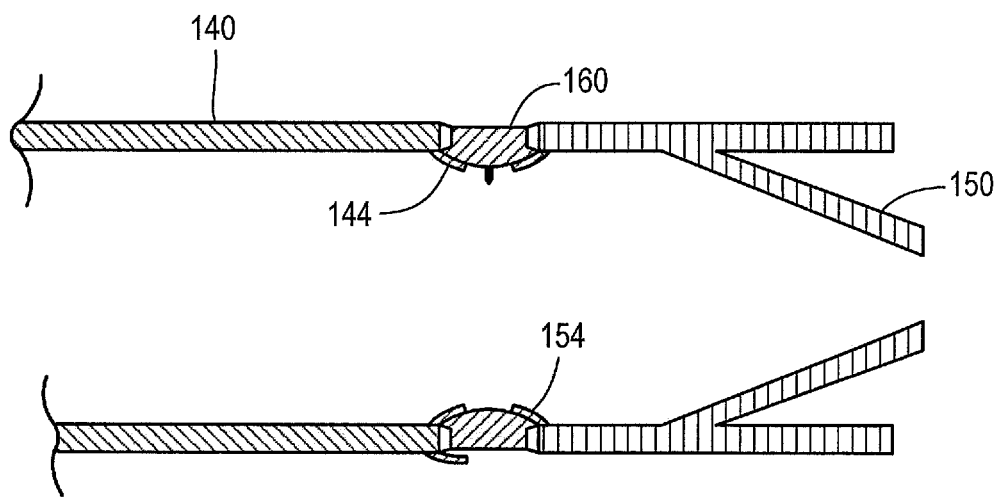
FIG. 2 is a cross section of the motor casing and nozzle of a rocket of a type used in the present and demonstrates how that the nozzle of the rocket is connected by an Ortman key to the rest of the motor section.

With reference to FIG. 2, the cross-sectional figure demonstrates that an Ortman key 160 secures the motor casing 140 to nozzle 150. As those in the art appreciate, an Ortman key is an elongated, rectangular metal bar which is rolled-inserted and pressure-fitted into respective grooves of mating components. As can be appreciated with reference to FIG. 2, the Ortman key 160 is bent in a circumferential manner so as to be fitted into the respective grooves 144, 154 of which form a joint between the motor casing 140 and nozzle 150.

Figure 3:
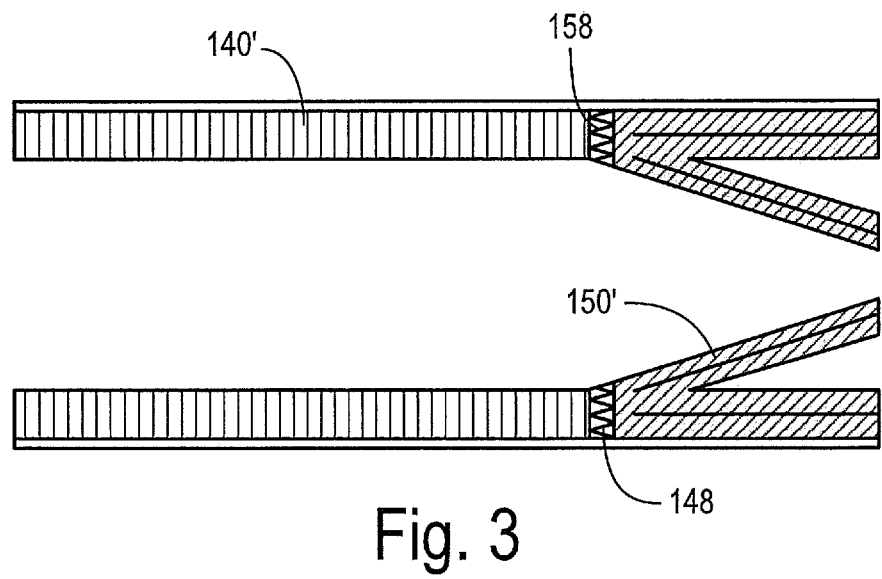
FIG. 3 is cross section of the motor and nozzle of rocket of a type used with the present invention with the nozzle and motor housing being secured by threaded connections.

With reference to FIG. 3, as an alternative to using an Ortman key as the means of connecting a motor casing 140' to the nozzle 150', the motor casing 140' and nozzle 150' can be provided with respective threaded joints 148, 158 for screwably or rotationally attaching and securing the motor casing 140' to the nozzle 150'.

Figure 4:
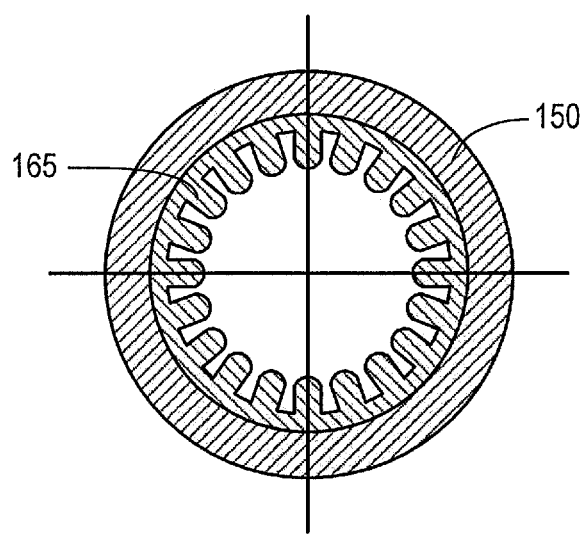
FIG. 4 is an end view of a rocket nozzle of a type as used with the present invention, with the rocket nozzle being provided with flutes.

With reference to FIG. 4, flutes 165 are provided on nozzle 150. As those in the art appreciate, the flutes 165 assist in imparting spin to the rocket as propellant gas exists the nozzle.

Figure 5:
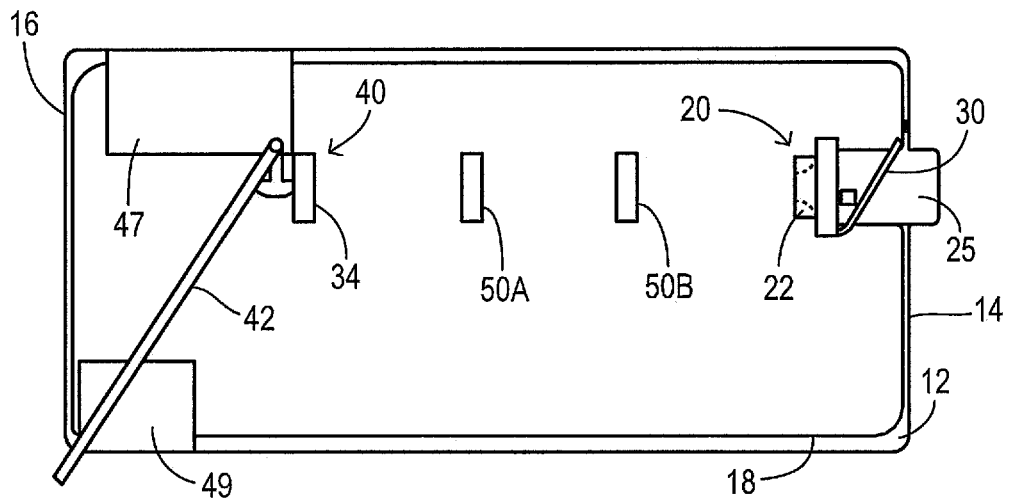
FIG. 5 is a top view of the rocket assembly and disassembly system of the present invention.
Figure 12:
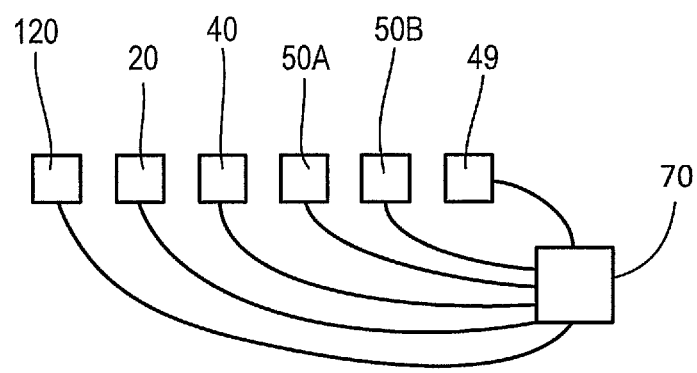
FIG. 12 is a schematic illustration of the components of the present invention being grounded to a static ground distributor.
Figure 13:
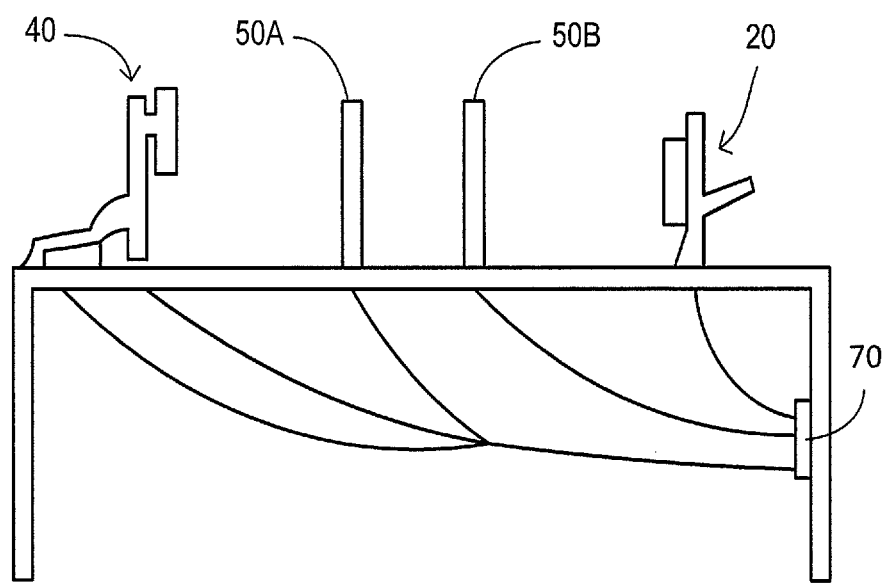
FIG. 13 is a side view of the rocket assembly/disassembly system of the present invention.

With reference to FIG. 5 rocket assembly/disassembly system 10 in accordance with the present invention is mounted on a table 12 having a static dissipative mat 18 which meets U.S. Army requirements for static dispersion. A compression assembly 40 is supported by base member 47 on the rocket-nozzle side 16 of table 12. At the other end of table 12 is a forward clamping assembly 20. The mat and all system components attached to the table are grounded using the static ground distributor 70 (FIGS. 12 and 13).

Figure 6:
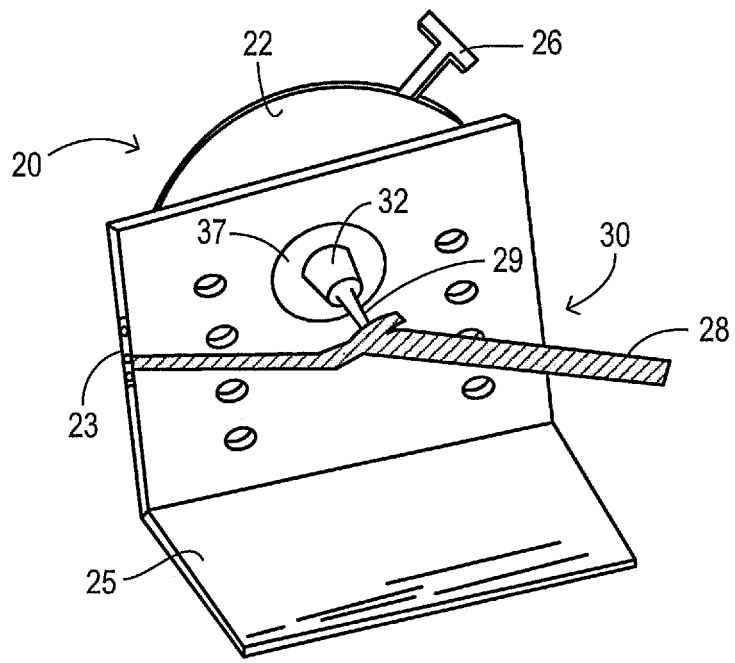
FIG. 6 is a rear perspective view of the forward clamping assembly of the present invention and the levered centering tool.
Figure 7:
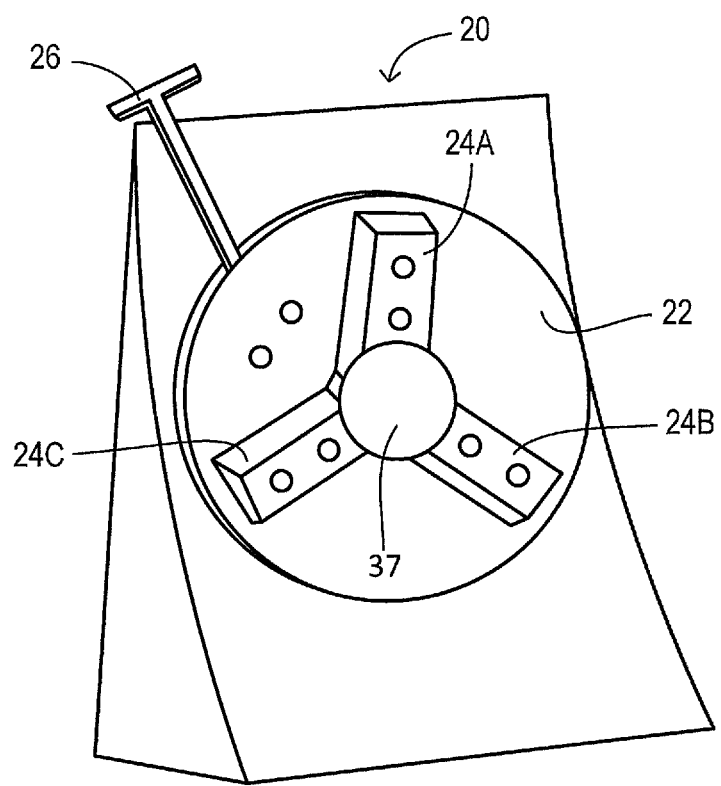
FIG. 7 is a perspective front view of the forward clamping assembly of the present invention.
Figure 8:
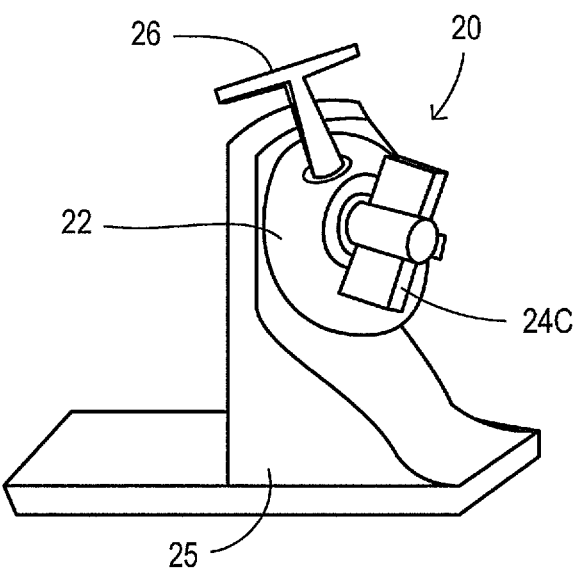
FIG. 8 is an isometric side view of the forward clamping assembly of the present invention.
Figure 9:
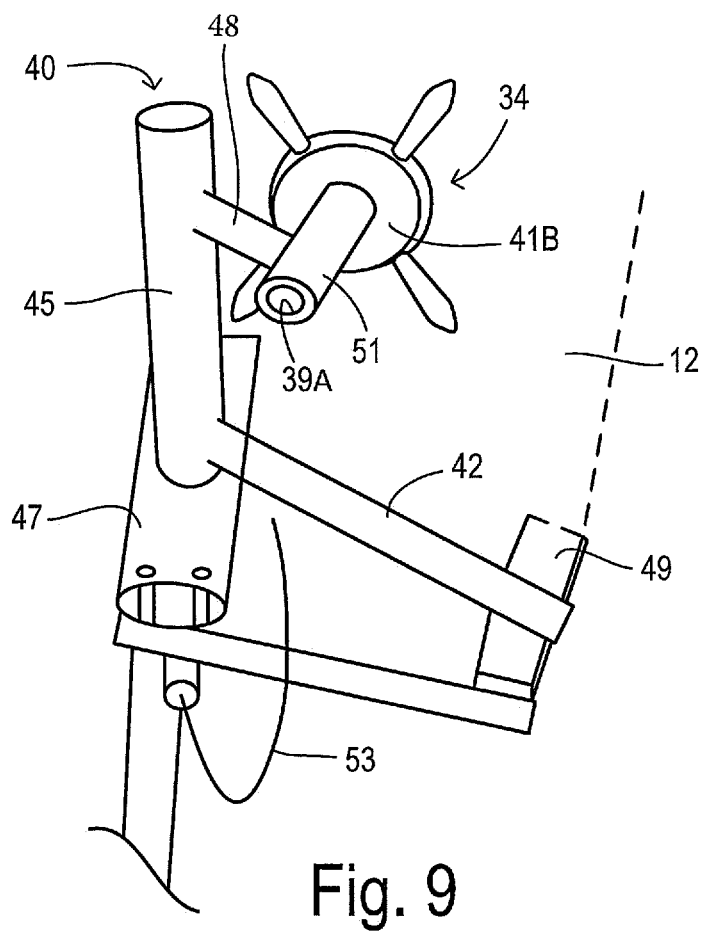
FIG. 9 is a rear perspective view of the compressor assembly of the present invention.
Figure 10:
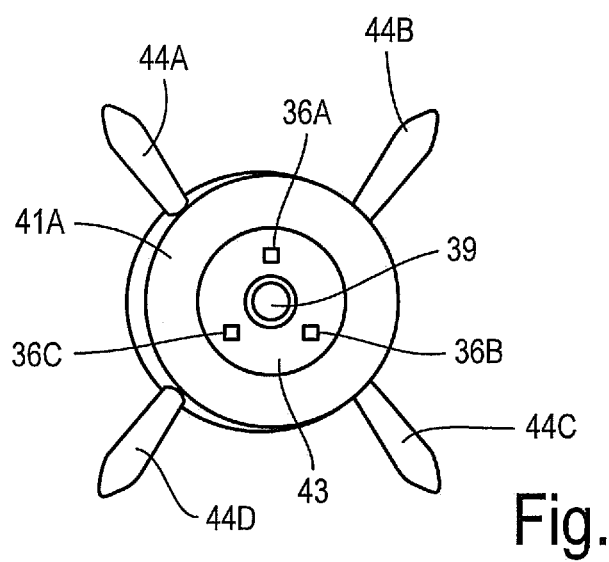
FIG. 10 is a front perspective view of the nozzle facing side of the compression assembly of the present invention.

With reference to FIGS. 6, 7 and 8, the rocket front-end side 14 of the table 12 has a forward clamping assembly 20. Clamping assembly 20 includes an annular chuck 22 mounted on a base 25 which is secured to table 12. Clamping assembly 20 is provided with three grippers or jawed clamps 24A, 24B, 24C positioned 120 degrees apart from one another on chuck 22. A T-handle or gripper adjuster 26 provided on the chuck 22 allows the grippers to be adjusted radially inward and outward by means of gearing (not shown) so as to secure the cylindrical front-end of a rocket or missile. The jaw clamps can be replaced with varying sizes of jaw clamps to accommodate and secure rockets of various diameters. A levered centering tool 30 is mounted on the table 12 and includes a lever arm 28 connecting to a cylindrical rocket-centering member 32 having a diameter approximating that of the rocket head section. The lever arm 28 is used to extend the cylindrical member 32 through a hole or passage 37 which extends through the base 25 and chuck 22.

After passing through the base 25 and chuck 22 the cylindrical member 32 is positioned in the interior of the rocket head section 135 so as to aid in centering and stabilizing the rocket 100 on the assembly/disassembly system 10. The lever arm is secured to a fastener plate 23 on the base 25. Lever arm 28 has a hinge connection with lever extension 29 which directly attaches to cylindrical member 32.

Figure 11:
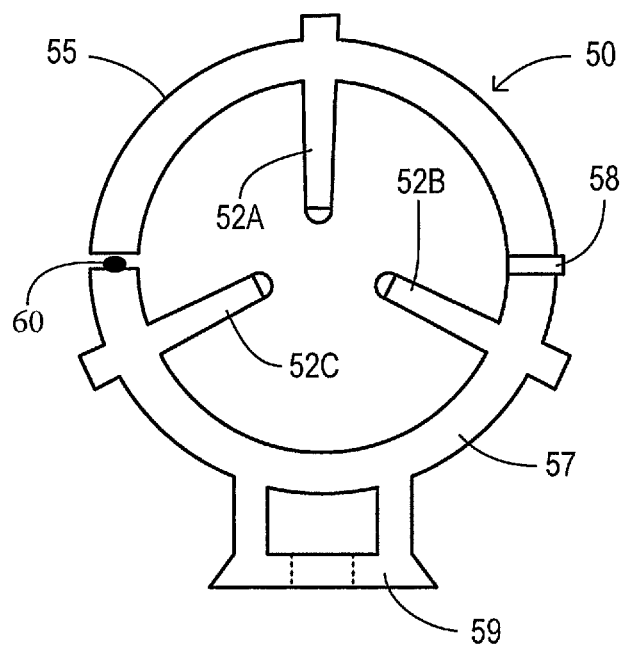
FIG. 11 is a frontal perspective view of a steady rest of the present invention.

A pair of steady rests or supports 50A and 50B (FIGS. 5 and 11) are positioned on the table 12 between the forward clamping assembly 20 and the fluted nozzle rotator 34. The steady rests support the mid-body of a rocket with the steady rests being provided with adjustable securing members 52A, 52B, 52C which can be screwed inward a desired radial distance for securing a rocket.

For rocket motors which are connected to the nozzle section by threaded connections, the disassembly of the rocket motor can begin once the rocket housing is secured in the forward clamping assembly and secured by the securing members 52 of the steady rests 50A and 50B. Each steady rest 50 has a bottom portion 57 supported by a base 59 attached to the table 12. Bottom portion 57 has a hinged connection 60 with a top portion 55. The top and bottom portions 55, 57 are secured by a latch 58.

At the rocket-nozzel side 16 of the table 10 is positioned a fluted nozzle rotator 34 which is part of a compression assembly 40. The compression assembly includes the fluted nozzle rotator 34, a lever pole 45, and a base member 47 that is secured to the table 12. The lever pole 45 is rotatable on the base member 47.

A pressing lever 42 is connected to the lever pole 45. Pressing lever 42 is provided with a lever-arm support 49 positioned on the rocket-nozzle side 16 of the table 12 opposite base member 47. A flange 48 connected to the lever pole 45 connects to a cylindrical support 51 to which the fluted nozzle rotator 34 is rotationally connected at the rear side 41B of the fluted nozzle rotator 34. The cylindrical support 51 is hollow and has a passage 39A which is a continuation of a hole or passage 39 in the center of the fluted nozzle rotator 34. The fluted nozzle rotator 34 is used to engage the nozzle of rocket motors which contain flutes in the nozzle exit cone.

At the nozzle-facing side 41A of fluted nozzle rotator 34 there is provided three teeth or engagement protrusions 36A, 36B, 36C which engage flutes of the rocket nozzle radially inward from the circumferential boundaries of the rocket nozzle. The teeth are radially situated within a recessed center section 43 of the fluted nozzle rotator 34. The hole or opening 39 in the center of the fluted nozzle rotator allows an electrical contact wire 53 to connect to the igniter of the rocket engine with the electrical connection extending to the static ground distributor 70.

When the fluted nozzle rotator is engaged in the flutes of the nozzle, the rotator is free to rotate in either clockwise or counter clockwise direction.

The pressing lever 42 may be utilized to place a compressive force on the rocket motor of the rocket. With the compressive force applied, the rotator handles or grips 44A, 44B, 44C, 44D of the fluted nozzle rotator 34 can be rotatably turned one way for inserting or applying an Ortman key during rocket assembly or the grips may be rotated the other way for disassembling the nozzle from the motor section. The compression assembly provided by the fluid nozzle rotator and pressing lever allows an operating person to apply the desired amount of tension to lock the rocket nozzle in place so the operator has free hands to attach or remove an Ortman key.

The static ground distributor 70 (FIGS. 12 and 13) is a centralized ground junction. All components attached to the table, i.e., including the forward clamping assembly 20, the steady rests 50A, 50B, the fluted nozzle rotator 34, the igniter 120 of the rocket are all wired to the static ground distributor 70 which is wired to the earth ground which provides for easy testing of the ground from one centralized location.

Figure 14:
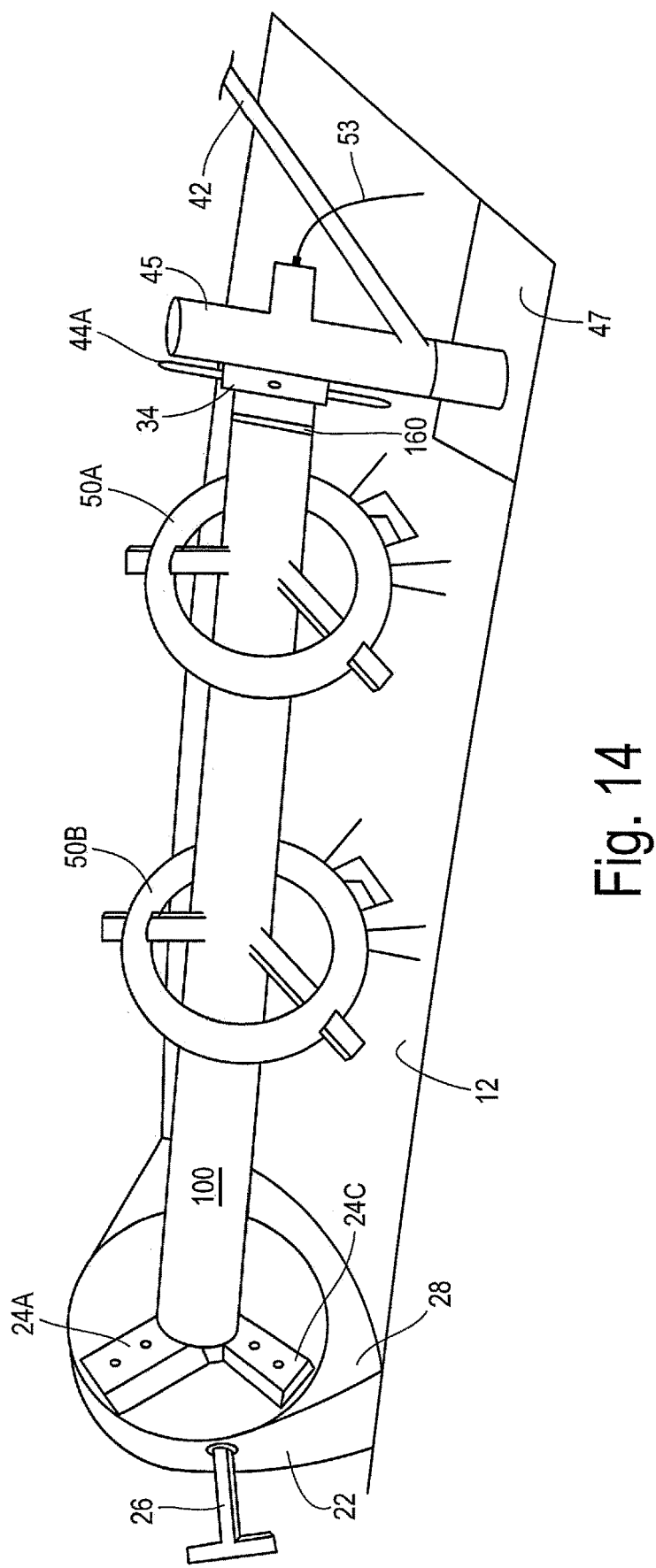
FIG. 14 is a perspective view of the present invention with a rocket mounted thereto for disassembly.

In FIG. 14, the rocket 100 is positioned on the rocket assembly/disassembly system 10 of the present invention for removal of the Ortman key 160 which securely connects the nozzle of the rocket to the rest of its motor section.

Various modifications and embodiments of the invention may be made by those skilled in the art without departing from the scope and spirit of the foregoing disclosure. Accordingly, the scope of the invention is limited only by the following claims.

What is claimed is:

1. A system for assembly and disassembly of a rocket motor comprising:
   a clamping assembly;
   a compression assembly;
   at least one steady-rest support; located between said clamping assembly and said compression assembly;
   a support platform upon which said clamp assembly, said compression assembly and said at least one steady-rest support are mounted; and wherein:
   said clamping assembly being located at the forward end of said support platform and having a chuck mounted on a base support, said chuck having a plurality of grippers circumferentially disposed around a passageway which extends through said chuck and through said base support, said chuck having an adjusting handle for adjusting a radial distance from the axial center of the passageway to each of said plurality of grippers;
   said compression assembly being located at a nozzle end of said support platform and having a lever pole rotatable on a base member by a lever arm, said lever pole having an extension flange connecting to a cylindrical support, said cylindrical support connecting to a fluted nozzle rotator such that a through passage extends through said cylindrical support and through said fluted nozzle rotator; and
   said at least one steady rest has a lower portion having a hinged connection with an upper portion, said at least one steady rest having a plurality of radially adjustable securing members.

2. A system according to claim 1, wherein:
   said fluted nozzle rotator is rotatable on said cylindrical support with a nozzle facing side of said fluted nozzle rotator having a plurality of engagement protrusions for engaging a rocket nozzle, said fluid nozzle rotator having a plurality of rotator handles for realizing manual rotation of said fluted nozzle rotator.

3. A system according to claim 2 wherein:
   said plurality of engagement protrusions are situated on a recessed center section and are radially oriented to said through passage.

4. A system according to claim 3, further comprising:
   a ground distribution assembly for grounding the system so as not to accidentally ignite propellant of a rocket, said ground distribution assembly including a ground distributor electrically connected to said clamping assembly, said compression assembly, and said at least one steady rest support.

5. A system according to claim 4, wherein:
   said plurality of grippers of said clamping assembly can be adjusted to securely grip a forward portion of a rocket and said plurality of adjusters of said at least one steady-rest support can be adjusted to securely grip a fuselage region of the rocket such that when said fluted nozzle rotator is rotated when said plurality of engagement protrusions are engaged in respective flutes of a rocket nozzle, torque is applied to the joint of the rocket which connects the rocket motor casing to the rocket nozzle.

6. A system for assembly and disassembly of a rocket motor, comprising:
   a clamping assembly having a chuck mounted on a base, with a passageway extending through said chuck and said base, said clamping assembly having a lever arm connected to a lever extension member that connects to a rocket centering member which extends through the passageway through said chuck and said base, said clamping assembly having a plurality of grippers for gripping the forward fuselage of a rocket, with an adjusting handle on said chuck being mechanically connected to said plurality of grippers for adjusting a radial distance from the axial center of the passageway to each of said plurality of grippers;
   a first steady rest having a base region connected to a semi-circular bottom portion, said first steady rest having a semi-circular top portion which has a hinged connection with said semi-circular bottom portion, said first steady rest having radially adjustable securing members connected to said top and bottoms portions for securing the middle region of a rocket fuselage; and
   a compression assembly having a lever pole which is rotatable on an assembly base, said compression assembly having a lever attached to said lever pole, said lever pole having a flange connected to a cylindrical support, said compression assembly having a fluted nozzle rotator that is rotatable on said cylindrical support with said cylindrical support having a through passage which extends through said fluted nozzle rotator, said fluted nozzle rotator having engagement protrusions for engaging the flutes of a rocket nozzle, and wherein
   said compression assembly, said first steady rest and said clamping assembly are mounted on a table with said first steady rest being located between said clamping assembly and said compression assembly and are aligned such that a rocket supported by said compression assembly, said first steady rest, and said clamping assembly is in parallel with the surface of said table.

7. A system according to claim 6, further comprising:
   a second steady rest, said first steady rest and said second steady rest being axially aligned and both being positioned between said compression assembly and said clamping assembly.

8. A system according to claim 7, further comprising:
   a ground distributor connected to said table, said ground distributor electrically grounding said first steady rest, said second steady rest, said compression assembly, and said clamping assembly.

9. A system according to claim 8, further comprising:
   a dissipative mat located on the surface of said table, said dissipative mat contacting said first steady rest, said second steady rest, said compression assembly, and said clamping assembly.

* * * * *